FIP8212 OR 3,876,875
250/201

United States Patent [19]

Velzel

[11] 3,876,875

[45] Apr. 8, 1975

[54] OPTICAL SYSTEM FOR FORMING AN IMAGE OF AN OBJECT IN A GIVEN PLANE

[75] Inventor: Christiaan Hendrik Frans Velzel, Eindhoven, Netherlands

[73] Assignee: U.S. Philips Corporation, New York, N.Y.

[22] Filed: Mar. 28, 1973

[21] Appl. No.: 345,645

[30] Foreign Application Priority Data

May 11, 1972 Netherlands 7206376

[52] U.S. Cl. 250/201; 250/566; 350/295

[51] Int. Cl. G03b 3/00; G01j 1/20

[58] Field of Search 250/201, 219 Q, 219 QA, 250/566; 350/295

[56] References Cited

UNITED STATES PATENTS

| | | | |
|---|---|---|---|
| 1,525,550 | 2/1925 | Jenkins | 350/295 |
| 2,410,502 | 11/1946 | Hurley | 250/201 X |
| 3,073,215 | 1/1963 | Fischer | 350/295 |

*Primary Examiner*—James W. Lawrence
*Assistant Examiner*—T. N. Grigsby
*Attorney, Agent, or Firm*—Frank R. Trifari; Simon L. Cohen

[57] ABSTRACT

A system for forming an image of an object in an image plane is described. By disposing a reflecting diaphragm in the back focal plane of an objective lens system, the curvature of this diaphragm being adjustable by means of a control element to which an electric signal supplied by an image detection system is applied, the size of the image in the image plane can be rendered independent of a change in the distances from the object to the optical system and from this system to the image plane.

3 Claims, 3 Drawing Figures

OPTICAL SYSTEM FOR FORMING AN IMAGE OF AN OBJECT IN A GIVEN PLANE

The invention relates to an optical system for forming an image of an object in an image plane, the size of the image in this image plane being independent of a variation in the distances from the object to the optical system and from the optical system to the image plane, which variation is detected by means of an optoelectronic image detection system.

Such a system may be used inter alia in an apparatus for reading a disc-shaped record carrier on which video and/or audio information is recorded in, for example, a spiral track having an optical structure. When reading such a record carrier a small part of the optical structure of the record carrier is always imaged on a radiation-sensitive detection system. Care must be taken to ensure that this part corresponds in size to the smallest detail of the optical structure.

The radiation paths between the source of radiation which provides a read beam and the plane of the track being read and between this plane and the detection system may be subject to small changes. These changes may be due to imperfections in the flatness of the record carrier or to wave motions which occur when a foil-like record carrier is rotated, or to vibrations of elements in the read apparatus. Such changes may cause a reduction of the depth of modulation of the read beam modulated by the optical structure and may give rise to cross-talk. These disadvantages can be avoided by using an imaging system of adjustable power.

Imaging systems the focal distance of which is adjustable by moving an objective or a part thereof are known, for example such a system is described in British Patent Specification No. 684,292. However, moving an objective or a part thereof will always have a certain inertia and may moreover give rise to an error of magnification.

It is an object of the present invention to provide an optical system of the type defined at the beginning of this specification which is capable of fast adjustment without the occurrence of magnification or imaging errors. The optical system according to the invention is characterized in that a reflecting diaphragm is disposed in the back focal plane of an objective lens system, the curvature of this diaphragm being adjusted by a control element to which an electric signal from the image detection system is applied. The term "image detection system" is to be understood to mean an optoelectronic system capable of providing a signal which is proportional to the deviation between the actual plane in which an image of an object is formed and the desired image plane. A detection system of this type is described inter alia in co-pending U.S. applications Ser. No. 229,291 filed Feb. 25, 1972 and U.S. Ser. No. 340,977, filed Mar. 14, 1973.

In an optical system according to the invention a lens which forms an image of the back focal plane of the objective lens system on the diaphragm is preferably arranged between the objective lens system and the diaphragm.

The control element may be a piezoelectric element which comprises a plurality of plates of a piezoelectric material which are clamped along two edges and carry electrodes on both surfaces.

The invention will now be illustrated, by way of example, by a description of its use in an apparatus for reading a flat record carrier. Reference is made to the drawing in which.

Figure 1:
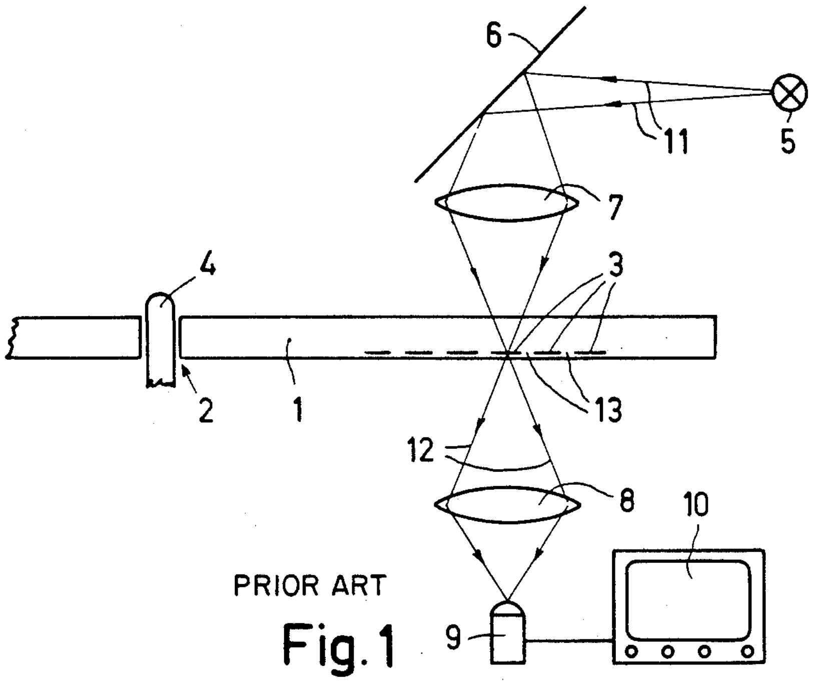
FIG. 1 shows schematically such a previously proposed read apparatus.

Referring now to FIG. 1, a circular record carrier 1, which is shown in radial section, is rotated by means of a spindle 4 which is driven by a motor, not shown, and passes through a center hole 2 in the record carrier. A beam of radiation 11 emitted by a source of radiation 5 is reflected to the record carrier by a plane mirror 6.

A plurality of concentric tracks 3 or a single spiral track are provided on the record carrier, in the embodiment shown at its lower surface. Each track comprises a plurality of regions which alternate with areas. The tracks are separated by intermediate strips 13 which carry no information. The regions in a track may, for example, absorb radiation, in which case the areas and the intermediate strips transmit radiation. In this case the amplitude of a beam of radiation which passes through the record carrier is influenced. Alternatively, the regions and the areas may be disposed at different levels in the record carrier. Such a structure, which is often referred to as a phase structure, enables the phase of a radiation beam to be influenced. The lengths of the regions and areas represent the stored information. A beam of radiation which has been modulated by the optical structure of the information exhibits pulsatory variations in time in accordance with the sequence of regions and areas in a track.

The read beam which has been modulated by a track of the record carrier and then is denoted by 12 is concentrated onto a radiation-sensitive detector 9 by a lens 8. The output of the detector may be connected to a device 10 provided with known electronic means for converting the output signal from the detector into picture and sound.

During the reading of the record carrier only a small part thereof, of the order of magnitude of the smallest detail in the optical structure of the information, is allowed to be imaged on the detector 9. This can only be effected if the plane of the track to be read is invariably at a correct fixed distance from the entrance pupil of the lens 8. As has been stated hereinbefore, the latter condition is not always fulfilled.

Various image detection systems for determining the relative position of the plane of the track to be read have already been proposed. In general at least two radiation-sensitive detectors are used, a difference between the output signals from these detectors providing an indication of the relative position of the plane of the track to be read. In the apparatus shown in FIG. 1, two detectors may be disposed at the location of the detector 9. The difference between the output signals from these detectors provides an indication of the relative position of the plane of the track to be read, while the sum of these signals may be applied to a device 10. Image detection systems of this type are described, for example, in co-pending U.S. Ser. No. 229,291, filed Feb. 25, 1972 and U.S. Ser. No. 340,977, filed Mar. 14, 1973, all commonly assigned.

In order to ensure that even in the case of a change in the optical path length between the plane of the track to be read and the lens 8 only the desired part of this track is imaged on the detector or detectors, the lens 8 is replaced by a system according to the present invention.

Figures 2, 3:
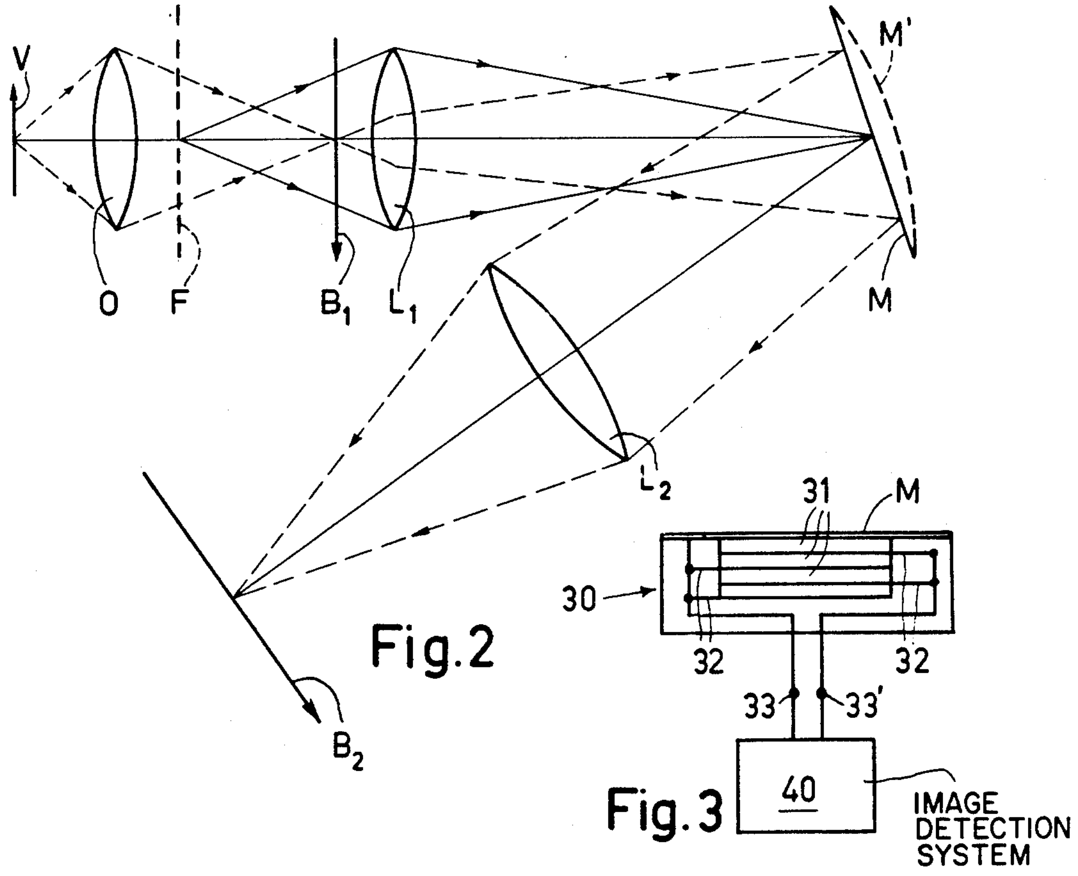
FIG. 2 shows an optical system according to the invention which may be used inter alia in such an apparatus.
FIG. 3 shows an exemplary embodiment of a control element.

As FIG. 2 shows, this optical system includes a first objective lens 0. The lens 0 forms an (intermediate) image $B_1$ of an object V; the path of the rays is indicated by broken lines. A reflecting diaphragm M, for example a metal foil, is inserted into the ray path at a point succeeding the lens 0. The curvature of the diaphragm may be varied (see shape M') by means of a control element an exemplary embodiment of which is shown in FIG. 3. To this control element 30 signals from an image detection system 40 are applied.

Positioning the diaphragm in the back focal plane F of the lens 0 enables a magnification error to be avoided. In order to retain this advantage also in objectives in which the back focal plane is not readily, or not at all, accessible, for example in an objective composed of a plurality of elements in which the back focal plane lies within the objective, according to the invention a field lens $L_1$ may be interposed between the objective 0 and the diaphragm. The lens $L_1$ forms an image of the back focal plane F of the objective on the diaphragm, as is shown by solid lines. The diaphragm M reflects the incident rays to a lens $L_2$ which forms a final image $B_2$ of the intermediate image $B_1$.

When the object V is spaced from the lens 0 by the required distance, as is shown in FIG. 2, an image $B_2$ is formed, with the reflecting surface of the diaphragm M being flat. When the position of the object V relative to the lens 0 changes, the intermediate $B_1$ also changes position, and if the diaphragm should remain flat, the final image is formed in a plane which does not coincide with the plane of the final image $B_2$. A change of the positions of the object V and of the intermediate image $B_1$ results in that the direction of incidence of the rays from the intermediate image on the diaphragm and the point of incidence of these rays on the diaphragm are changed. By appropriately adapting the curvature of the diaphragm these changes may be compensated for, so that a final image is again formed in the plane of the image $B_2$.

When the optical image shown in FIG. 2 is used in a reading apparatus as shown in FIG. 1 the distance through which the object, in this case the plane of the track to be read, can shift will generally be very small, of the order of 100 $\mu$m. Hence the diaphragm need to be curved very slightly only. Thus, the image defect due to curvature of the diaphragm will be negligible, because this defect decreases with about the third power of the radius of curvature.

The diaphragm may be controlled in various manner. It may, for example, be secured to a piezoelectric element. An embodiment of such an element shown in FIG. 3 comprises a plurality of plates 31 which are clamped along two edges and are made of a ceramic material having a given bias polarization. The plates 31 are separated from one another by electrically conducting coatings 32 which are alternately connected to terminals 33 and 33'. In accordance with the voltage produced at these terminals by the image detection system 40 the bias polarization of the plates will be neutralized to a greater or lesser extent, causing the plates 31 and hence the diaphragm M to curve in a greater or lesser degree.

In order to amplify the curvature of the diaphragm produced by the plates a liquid amplifier may be used, the piezoelectric element being connected to a first diaphragm which forms one of the walls of a liquid-filled space. The movements of this first diaphragm are transferred via the liquid to a second diaphragm, with an ensuing amplification of these movements which is determined by the ratio between the surface areas of the two diaphragms. Thus a small control voltage enables a sufficiently large deflection to be obtained.

Instead of by piezoelectric means the curvature of the diaphragm may be controlled by electromagnetic means in that a current signal supplied by the image detection system 40 is passed through a winding of a coil arranged opposite the diaphragm. The deflection of the diaphragm may further be controlled by electrostatic means with the use of an electrode which is arranged opposite the diaphragm and to which the output voltage of the system 40 is applied.

In all these embodiments the diaphragm may be of very light construction, so that the time which elapses between the instant at which a signal appears at the terminals of the control element and the instant at which the diaphragm has assume the shape associated with this signal is very short. Hence the cut-off frequency of the control system is high.

In the read apparatus described with reference to FIG. 1 the optical system according to the invention was used to form an image of a small part of a comparatively large illuminated area of the record carrier on the or each detector. However, in the read apparatus the source of radiation may alternatively be imaged on a small part of the record carrier of the order of the smallest detail in the optical structure. For this purpose also an imaging system including a diaphragm of adjustable curvature may be used. However, in this case it is not absolutely necessary for the diaphragm to be disposed in the back focal plane of an objective lens system, because when the radiation source is imaged on the record carrier a magnification error is less important.

The fact that the optical system according to the invention has been described with reference to an apparatus for reading a flat record carrier does not imply at all that the invention is limited to this apparatus.

The optical system according to the invention may be used in all apparatuses in which an object is to be imaged with true dimensions without magnification error and in which an image detection system is present. An example is copying objects in a ratio of 1 to 1, where the dimensions of the image are significant. Another example is forming the images of two objects which are situated in different object planes in a single image plane, such as imaging a photographic mask and a slice of a semiconductor material in one plane in the manufacture of integrated circuits.

What is claimed is:

1. Optical system for forming an image of an illuminated object in an image plane, the size of the image in this image plane being independent of a variation in the distances from the object to the optical system and from the optical system to the image plane, with the use of an electrical distance detection system signal indicating said variations in distance, comprising an objective lens system for focussing the image of the object in the image plane; a reflecting diaphragm is disposed in the back focal plane of the objective lens system, and a detection signal responsive control element means for adjusting the curvature of the diaphragm in response to the electric signal from the distance detection system.

2. Optical system as claimed in claim 1, further comprising an additional lens arranged between the objective lens system and the diaphragm for forming an image of the back focal plane of the objective lens system on the diaphragm.

3. Optical system as claimed in claim 1 wherein the control element is a piezoelectric element which comprises a plurality of plates of a piezoelectric material which are clamped along two edges and carry electrodes on both surfaces.

* * * * *